July 26, 1927.
G. B. WADSWORTH
ELECTRICAL SWITCH
Filed Jan. 5, 1920  2 Sheets-Sheet 2
1,636,882
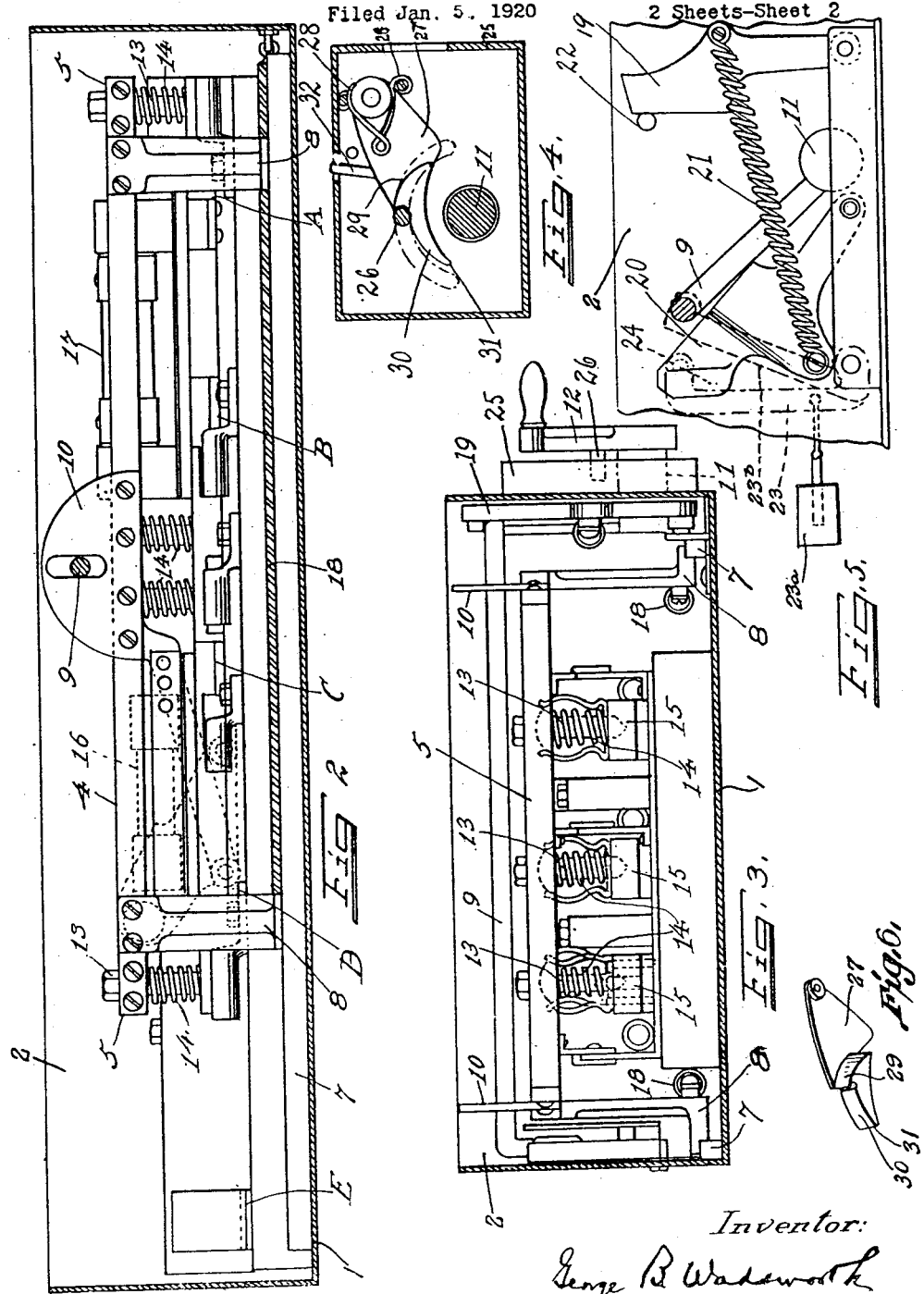
Inventor:
George B Wadsworth
By Allen Lee
Attorneys.

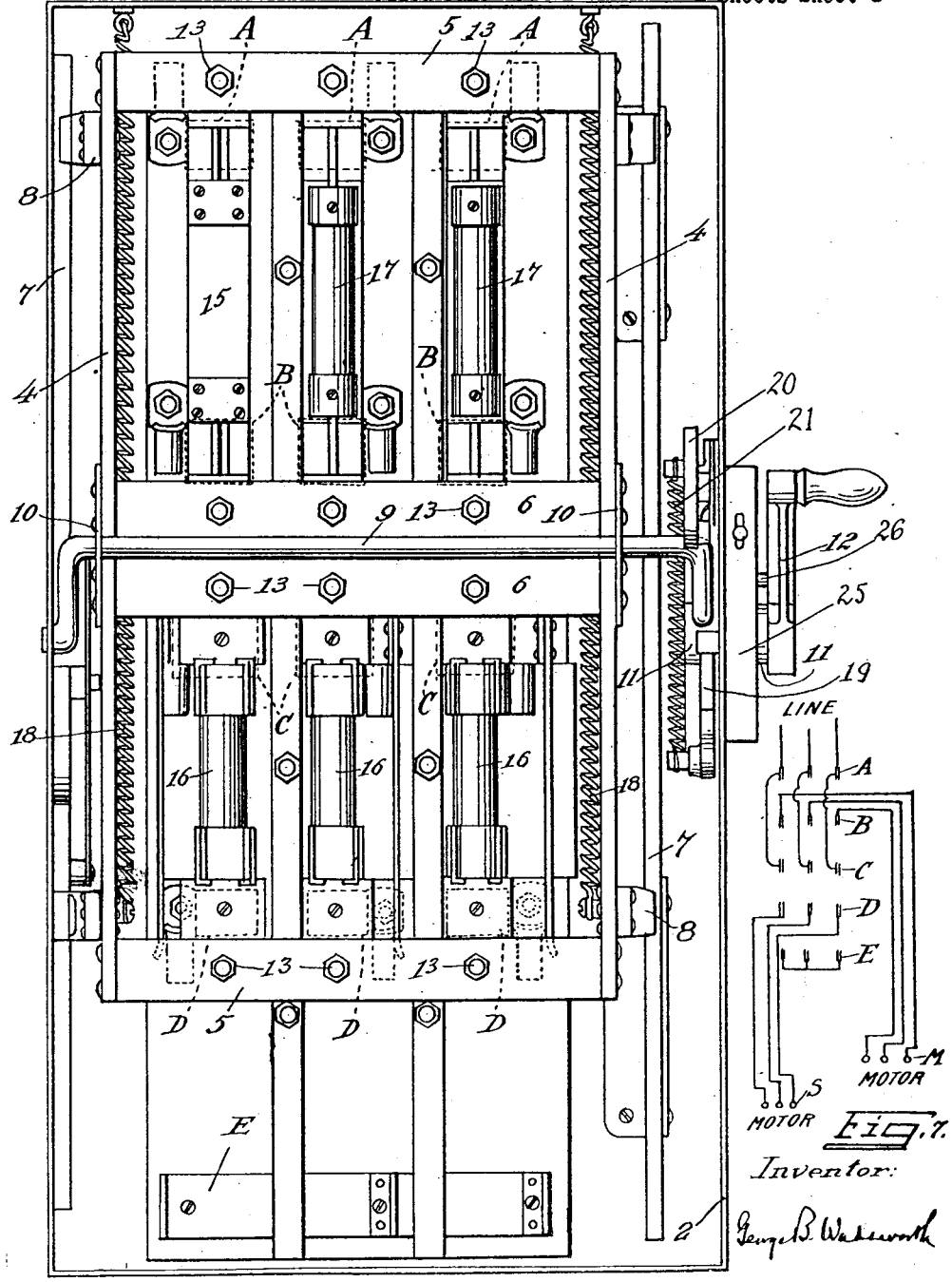

Patented July 26, 1927.

1,636,882

UNITED STATES PATENT OFFICE.

GEORGE B. WADSWORTH, OF COVINGTON, KENTUCKY.

ELECTRICAL SWITCH.

Application filed January 5, 1920. Serial No. 349,426.

My invention relates to electrical switches of the type having a double throw, same being more particularly employed for the starting of electric motors in order to throw in progressively different windings or resistances, thereby preventing the burning out of the motor by an excessive starting current.

In electric motor switches, there are various types of windings to which my invention would be applicable, but it is specially adapted in some of its features to use with the "star delta" wound motors. The "star delta" winding, which it is not necessary to describe in detail, has two sets of windings, uses a three-wire delivery of current, and straps across the three wires so as to neutralize the central wire in starting position.

In the past, the great difficulty in connection with the star delta winding has been that the switches have not been sufficient to take care of the various connections in a safe and foolproof manner. Thus there have been in the past two switches for the star delta, one a main line switch and the other a double throw switch which either strapped the three wires of the system together, or directed a current through a shunt for the additional motor winding. If the double-throw switch were left in neutral position and the main line switch on, the motor would stop, but any short circuit would then burn out the motor, also the throwing of the main switch would burn out the motor unless the double throw switch were in strapping position.

Thus it can be readily observed that a switch which will at once take care of all three needs of the star delta system of winding is badly needed in the art.

In addition to taking care of the star delta winding of a motor, it is among my objects to provide a sliding contact switch which is self-seating, under control of springs. Thus in my preferred embodiment, the switch bars which are also fuse carriers, are suspended in a movable frame, with springs forcing them downwardly against their contacts.

I further provide a simple and effective mechanism for forcing the operator of the switch to first throw the same to starting position, and from starting to full current position. If released from full-on position, the switch is then automatically returned to neutral by means of a "no volt" release, which locks the switch on, but if the current is not proper, will release the lock by means of its operating solenoid, whereupon it will move to neutral position, as noted.

As the switch is under control of springs and gravity when set upright, as in use, there will be a quick break in each instance from its contacts, due to the pull of the springs. I therefore provide no special quick break mechanism for my switch, although such could be supplied if necessary.

The above objects and other advantages which will be noted I accomplish by that certain construction and arrangement of parts to be hereinafter more specifically pointed out and claimed.

In the drawings,

Figure 1 is a plan view of the switch mechanism with the box cover removed.

Figure 2 is a side elevation of said operating parts, with the box casing broken away.

Figure 3 is an end elevation thereof.

Figure 4 is a detail elevation showing the pivoted plate for controlling the switch arm as to direction of movement.

Figure 5 is a detail elevation of the balanced lever construction and spring, which act on the switch throwing yoke.

Figure 6 is a perspective of the sequence device.

Figure 7 is a diagram of the switch points and connections for a star delta motor starting switch.

The switch is preferably mounted in an enclosed box having a base 1, sides 2 and a removable top 3. The box is preferably so made up that the entire switch mechanism and all live contacts are capable of being locked in the box, with sliding covers under control of the switch for permitting access to the fuses only when the switch is in neutral position.

In the base of the box, for the star delta switch, are the five sets of contacts A, B, C, D and E, each of which consist of three poles. As shown in the diagram (Figure 7), the contacts A and C are connected together and to the main line, while poles B and D are connected to the motor windings M and S respectively. The poles E, however, are merely strapped together.

When B and C are connected, the main line current goes to the motor, and in this position the poles D and E should be connected so that the middle wire is strapped, thereby cutting down the motor current for starting. When poles A and B are connected and poles C and D, the motor is to be in full operation with both windings M and S supplied with current.

Thus it is the object of my switch from this point of view, to have three bar positions, one neutral, a second in position B—C and D—E, and a third in position A—B and C—D. Furthermore it is the object to force the operator to move from neutral to the second position and from the second to the third in rotation, and thence back to neutral.

The contacts are mounted in the base or bottom of the box on any desired manner, and comprise flat, level plates. The movable member of the switch is a frame of side bars 4, 4, ends 5, 5, and two central bars 6, 6. This frame slides on two tracks 7, 7, located in the base of the box by means of depending bars 8 on said frame.

A wide yoke 9 is employed to throw or slide the frame, and engages in apertured plates 10 erected at the sides of the frame in the middle thereof. At one side of the casing, the yoke is merely pivoted in the side wall thereof, and at the other it is set in the shaft 11, which is controlled from outside of the casing by a handle 12.

Extending through the end plates 5 and the central cross plates or bars 6, in sets of three, are spring bolts 13, having helical springs 14 around them. These bolts support the switch bars 15, there being one bolt at each end of each switch bar, and three bars side by side in each half of the frame.

The switch bars carry the fuses 16 and 17, set therein and are arranged with their contacts so as to accomplish the connections noted above, to wit: the lower of the three bars connects either the poles C and D or the poles D and E, and the upper bars connect either A and B, or B and C.

The contact made by the switch bars is ensured to be an even and complete one, due to the spring tension exerted against the bars, which automatically forces them to a perfect seat and compensates for any wear that may take place.

The entire frame is spring-drawn upwardly or toward the contacts A by means of springs 18, which are secured at the upper end of the box. These springs, in the construction shown in the drawings, serve mainly as a counter-balance for the pull of gravity on the sliding frame, while the controlling spring is applied to the yoke, as will be described.

In its lowermost position, the contacts are arranged to start the motor, and in the upper position they are arranged to make the connections for full running strength, while in central position no contacts are made, and the switch is neutral.

Mounted in the side of the casing adjacent the handle in the embodiment shown in the drawings, are two pivoted plates 19, 20, which are connected together by a strong spring 21, and bear against the switch actuating yoke 9. The plate 19 which controls the lower part of the switch (Figure 5) is stopped by a pin 22, in a position which will permit the yoke to be in neutral, or upright position. The plate 20 is also stopped by this pin at neutral, and in addition is stopped in its depressed position by a "no volt" release bar 23. This bar controlled by a solenoid 23$^a$, according to usual practice, swings into a position under normal current, to engage over a lip 24 on the said plate 20. When no current is on, the bar 23 will not engage the plate but will lie in the position 23$^b$, and there will be nothing to hold the switch in its normal running position.

It will be noted that the pivot of the bar 23 is sufficiently offset from the point of engagement of the tongue 24 on the plate 20, that the initial movement of the bar is slightly upward, which will permit the bar to swing away from the plate 20.

In the device so constructed, when the switch handle is moved to throw the yoke over toward the contacts E, the plate 19 will be pressed down by the yoke, and put the spring 21 under tension. The release of the operating handle by the operator will then cause an upward throw of the yoke, and continued movement of the yoke will depress the plate 20 (as shown in Figure 5), thereby putting the spring 21 under tension in the opposite direction.

Upon release of the switch handle, when the switch is in its upper position, this spring 21 will pull it away from contact and down to neutral position, being assisted by gravity and counterbalanced by the springs 18.

The neutral position is assured by the fact that the effect of this spring 21 is to draw both of the plates 19 and 20 to a position in contact with the central stop pin 22, which is located to assure an upright position of the yoke.

To force a proper operation of the handle, a small box 25 is mounted on the outside of the casing above the shaft 11, and a pin 26 on the handle rides in a suitable slot in this box. Inside of the box is a "balanced" plate 27, spring-held in a central position by means of two springs 28, 28, held inside the box by suitable screws or otherwise as desired.

This plate has a cam ridge 29 thereon terminating in a shoulder from which it extends down in another cam surface 30 to a point 31. The pin 26 on the operating handle rides over this plate and the cam surfaces thereon. In the position shown in Figure 4, the switch is in neutral. A downward movement of the handle causes the pin to ride over the surface 30, and the spring control of the plate forces the end thereof to a position above the pin. An upward movement of the handle will then move the pin past the underside of the plate, whereupon the end of the cam ridge will move below the pin, so that upon a return to neutral the pin will have to ride over the cam ridge.

Once over the cam ridge, the pin rides behind the shoulder of the cam ridge, and the handle can no longer be forced back upwardly because of the shoulder engaging the pin. It can be observed that together with the two spring plates 19 and 20, the operation of the handle must be in the succession several times pointed out above. These must be from neutral to starting position, from starting position to full running position and from full running position to neutral, with the spring plates giving a quick break.

If it is desired to go back to neutral from starting position, a pin 32 may be mounted on the plate 27, which extends out through the box 25 sufficiently so that when the plate is in its uppermost position, the depression of the pin will throw it down enough to let the handle move back up over the cam end 30. This last is not necessary and may be omitted from the construction, or some other corresponding means utilized.

It is believed that the operation of the switch has been sufficiently described during the course of the above specification, and that a further explanation thereof is not necessary. It is capable of ready observation that many of the features of the switch described are applicable to other than "star delta" switches, and that alternative structures could well be inserted in place of those described in detail without departing from the spirit of my invention, which in its essential details is a double-throw, double-contact switch, having an enforced series of operations for motor starting, and possessed of electrical efficiency and safety for the operator.

Having thus described my invention, what I claim as new and desire to secure by Letters Patent, is:

1. In an electric switch, the combination of a series of five sets of electric contacts arranged in line, three contacts in a set, with the fifth set strapped, and the first set connected to the line and strapped to the third set, and the second and fourth sets connected to the load by separate wires, and a movable switch element, adapted to be shifted to connect sets one and two and three and four, or selectively to connect sets two and three, and four and five, and to a neutral nonconnecting position.

2. In an electric switch, the combination of a series of five sets of electric contacts arranged in line, three contacts in a set, with the fifth set strapped, and the first set connected to the line and strapped to the third set, and the second and fourth sets connected to the load by separate wires, and a movable switch element, adapted to be shifted to connect sets one and two and three and four, or selectively to connect sets two and three, and four and five, and to a neutral nonconnecting position, said movable member comprising two sets of connector bars, said connector bars carrying fuses therein.

3. In an electric switch, the combination of a series of five sets of electric contacts arranged in line, three contacts in a set, with the fifth set strapped, and the first set connected to the line and strapped to the third set, and the second and fourth sets connected to the load by separate wires, and a movable switch element, adapted to be shifted to connects sets one and two and three and four, or selectively to connect sets two and three, and four and five, and to a neutral nonconnecting position, and means for enforcing upon the movable member a sequence of movement from neutral to the one active position, thence to the other active position, and thence to neutral.

4. A motor starting switch adapted to take a starting position, a full running position and a neutral position between the other positions, and means for enforcing a movement thereof so that from neutral position it can move to starting position only, and from starting position to full-on position only, and from full-on position to neutral position only, and manually operable means adapted to inhibit the action of said enforcing means so as to permit the switch being moved from starting to neutral position without passing through full-on position.

5. In an electrical switch, the combination of a box, flat electrical contacts in the box, a slidable frame in the box, having ends and central cross members, and switch bars mounted on each end and the central members, the mounting means for the bars comprising bolts slidable in the ends and cross members, said bolts connected to the bars and having helical springs thereon tending to press the bars away from the said ends and cross members.

6. A motor starting switch adapted to take a starting position, a full running position and a neutral position between the other positions, and means to enforce a movement thereof so that from neutral it can move to starting position only, and from starting position to full-on position only, and from full-on position to neutral position only, and manually operable means to permit a return from starting position to neutral.

GEORGE B. WADSWORTH.